(12) United States Patent
Huang et al.

(10) Patent No.: US 6,343,299 B1
(45) Date of Patent: *Jan. 29, 2002

(54) METHOD AND APPARATUS FOR RANDOM UPDATE SYNCHRONIZATION AMONG MULTIPLE COMPUTING DEVICES

(75) Inventors: Yun-Wu Huang, Mount Kisco; Philip Shi-Lung Yu, Chappaqua, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,676

(22) Filed: Nov. 16, 1998

(51) Int. Cl.$^7$ ................................................ G06F 17/30
(52) U.S. Cl. ...................... 707/203; 707/201; 707/200; 707/8
(58) Field of Search ................................ 707/203, 200, 707/201, 8

(56) References Cited

U.S. PATENT DOCUMENTS

| | | | | |
|---|---|---|---|---|
| 4,714,992 A | | 12/1987 | Gladney et al. | 707/206 |
| 4,714,996 A | | 12/1987 | Gladney et al. | 707/203 |
| 5,261,094 A | | 11/1993 | Everson et al. | 707/201 |
| 5,280,612 A | * | 1/1994 | Lorie | 707/8 |
| 5,404,508 A | | 4/1995 | Konrad et al. | 707/202 |
| 5,434,994 A | | 7/1995 | Shaheen et al. | 709/223 |
| 5,560,005 A | | 9/1996 | Hoover et al. | 707/10 |
| 5,581,754 A | | 12/1996 | Terry et al. | 707/8 |
| 5,649,195 A | | 7/1997 | Scott et al. | 707/201 |
| 5,671,407 A | | 9/1997 | Demers et al. | 707/8 |
| 5,684,984 A | | 11/1997 | Jones et al. | 707/10 |
| 5,737,601 A | | 4/1998 | Jain et al. | 707/201 |
| 5,765,171 A | * | 6/1998 | Gehani | 707/203 |
| 5,787,247 A | | 7/1998 | Norin et al. | 709/220 |
| 5,787,262 A | | 7/1998 | Shakib et al. | 709/205 |
| 5,832,489 A | * | 11/1998 | Kucala | 707/10 |
| 5,999,947 A | * | 12/1999 | Zollinger | 707/203 |
| 6,041,123 A | * | 3/2000 | Colvin | 713/153 |

FOREIGN PATENT DOCUMENTS

| | | |
|---|---|---|
| EP | 226734 | 7/1987 |
| EP | 765062 | 3/1997 |
| WO | WO-950880 | 3/1995 |
| WO | WO-9704389 | 2/1997 |

* cited by examiner

*Primary Examiner*—Jean R. Homere
*Assistant Examiner*—Greta L. Robinson
(74) *Attorney, Agent, or Firm*—F. Chau & Associates, LLP

(57) ABSTRACT

A computing device has a database replica comprised of a plurality of records. A synchronization request is provided to a further computing device having a further database replica which is comprised of a further plurality of records. A version table maintains version numbers for each of the plurality of records. The version numbers each have a maximum size. The maximum size is selectable. The plurality of records may be synchronized with the further plurality of records based upon the version numbers.

33 Claims, 13 Drawing Sheets

| RECORD ID | VERSION LIST |
|---|---|
| (1,1) | (1,1) |
| (1,2) | (1,1) |

FIG. 2A

| RECORD ID | VERSION LIST |
|---|---|
| (1,1) | (1,1) (2,0) |
| (1,2) | (1,1) (2,0) |

FIG. 2B

| RECORD ID | VERSION LIST |
|---|---|
| (1,1) | (1,1) (2,0) |
| (1,2) | (1,1) (2,1) |
| (1,3) | (1,1) (2,0) |
| (2,1) | (1,1) (2,1) |

FIG. 2C

METHOD AND APPARATUS FOR RANDOM UPDATE SYNCHRONIZATION AMONG MULTIPLE COMPUTING DEVICES

FIELD OF THE INVENTION

The present invention relates in general to memory updating and more specifically to update synchronization among multiple computing devices. In particular, devices which are temporarily connected to the network are update synchronized with other devices which reside on the network.

BACKGROUND OF THE INVENTION

With the rapid advancement of semiconductor, storage and display technologies, hand held or mobile devices have become increasing versatile and popular. A user may simultaneously posses several of these devices, such as Palm Pilot (which is a trademark of IBM Corporation, Armonk, N.Y.), mobile phone, laptop PC, home PC, office workstation, etc. A single database, file or document may be multiply replicated over several of these computing devices.

A critical issue in this environment is that these multiple replicas on the various devices may be updated independently. Furthermore, the update synchronization can occur between any pair of devices. Since many of these devices are mobile or hand held, they are only occasionally connected either to the network or directly to another device. Any centralized scheduling on update synchronization will not work in this envirornent. Neither will the client-server model where each client machine will always perform synchronization with a pre-assigned server. Here the appropriate model is the any-to-any synchronization model, where any pair of devices can perform synchronization with each other at any time. For example, assume an individual has four devices: Palm Pilot, Thinkpad (which is a trademark of IBM Corporation, Armonk, N.Y.), office workstation and desktop PC at home. The individual may want to replicate his calendar over all of these devices. On a business trip, he may bring the Palm Pilot and Thinkpad with him. He can leave the Thinkpad in the hotel and only carry the Palm Pilot to his business meeting. When returning to the hotel, he can synchronize the Thinkpad with the Palm Pilot which contains the update he had made during the day. The individual can then use the Thinkpad to dial up to the office workstation to synchronize with the update made by his secretary on the workstation copy. His wife at home can synchronize the copy on the home PC with the office workstation so she can let him know the weekend schedule.

This update synchronization issue is different from the conventional database update issue among multiple replica where most of the devices are always connected. The standard transactional approach is to propagate every update to all replica before a transaction can commit. This is described, for example, in P. A. Berstein, et al., "Concurrency Control and Recovery in Database Systems", Addision-Wesley, Reading, Mass. 1987. This update or write-all approach can use any serializable concurrency control to synchronize access to the multiple copies. A variation is to allow for only updating a majority of the replica or quorum consensus. Another variation is the lazy propagation approach where only one replica is updated by the transaction itself, as for example, Y. Breitbart, et al., "Replication and Consistency: Being Lazy Helps Sometimes", Proc. ACM Symposium on Principles of Database Systems, 1997, pp. 173–184. In this approach, a separate transaction runs on behalf of the original transaction at each replication site at which update propagation is required. Consistency can be ensured by directing all updates to a primary copy and employing appropriate concurrency control.

The issue considered is also different from that in a client server environment. In a client server environment, although the client can stay mostly unconnected, it always has a specific server to synchronize to. See for example, in L. Kawell, et al., "Replicated Document Management in a Group Communication System", in Groupware: Software for Computer-supported Cooperative Work, pp. 226–235, IEEE Computer Society, 1992, and K. Moore, "The Lotus Notes Storage System", Proc. ACM SIGMOD 95 conference, pp. 427–428 on the replication approach in Lotus Notes. In this approach, the time of last modification is kept with each record (or document) of a replica. Only the records modified since the last synchronization are exchanged during the synchronization. Another approach as used by Palm Pilot is to maintain a dirty bit on each modified record. When a record is modified, the dirty bit is turned on. During synchronization, all modified records are exchanged and the dirty bits are reset to zero. For example, R. Riggs, "MNCRS Data Synchronization Architecture Document", www.oadg.or.jp/activity/mncrs/dsync/arch/datasyncarch.html, specifies a framework for data synchronization between mobile network computers, such as Palm Pilot, and its servers or peers.

In the environment considered here, a device can request sync with any other device. There is no designated sync server for a device. A straightforward approach to do any-to-any sync is to maintain a local time-stamp on update by each device on each record, e.g., device 1 updates record 1 at 9:50 am, Jun. 23, 1997 and device 2 updates the same record at 10:50 am, Jun. 25, 1997. Since the update time is based on local device time, no global time synchronization would be required. The problem with this time-stamp approach is that the number of bits required to represent the time-stamp is sizable. For example, a time stamp with year/month/date/time can require more than 32 bits. As the number of records and devices increases, it will cause considerable delay to perform the synchronization, especially in a low bandwidth environment such as a phone line.

An alternative approach is the local counter approach that maintains a local counter on each device, where every time a record of a database (or file) is updated (or inserted/deleted) by a device, the local counter for the device which performed the update is incremented by one, and assigned to that file as a version number. For example, D. S. Parker, et al., "Detection of Mutual Inconsistency in Distributed Systems", in IEEE Trans. On Software Engineering, Vol. SE-9, No. 3, May, 1983, pp. 240–247, provides a means to detect version conflict through maintaining the version numbers from each system or device to a file. This version number can still become an arbitrarily large number.

SUMMARY OF THE INVENTION

A computing device has a database replica comprised of a plurality of records. A synchronization request is provided to a further computing device having a further database replica which is comprised of a further plurality of records. A version table maintains version numbers for each of the plurality of records. The version numbers each have a maximum size. The maximum size is selectable. The plurality of records may be synchronized with the further plurality of records based upon the version numbers.

BRIEF DESCRIPTION OF THE DRAWINGS

FIGS. 2(a), 2(b) and 2(c) depict examples of version tables which contain update information for exchange during synchronization to identify for each record which device has the more up-to-date version of that record.

DETAILED DESCRIPTION OF THE INVENTION

It is desirable to use a compact version number per device for each record which takes just a few bits (say 2 or 4) to represent the version of the record, while allowing for multiple computing devices to maintain replica of data objects and perform updates independent of the other replica. The synchronization with other replica is desirably carried out in any arbitrary order efficiently (i.e., with low bandwidth requirement) in a pair-wise fashion as these devices are most disconnected from each other. This compact representation can reduce the bandwidth requirement substantially by an order of magnitude.

Figure 1:
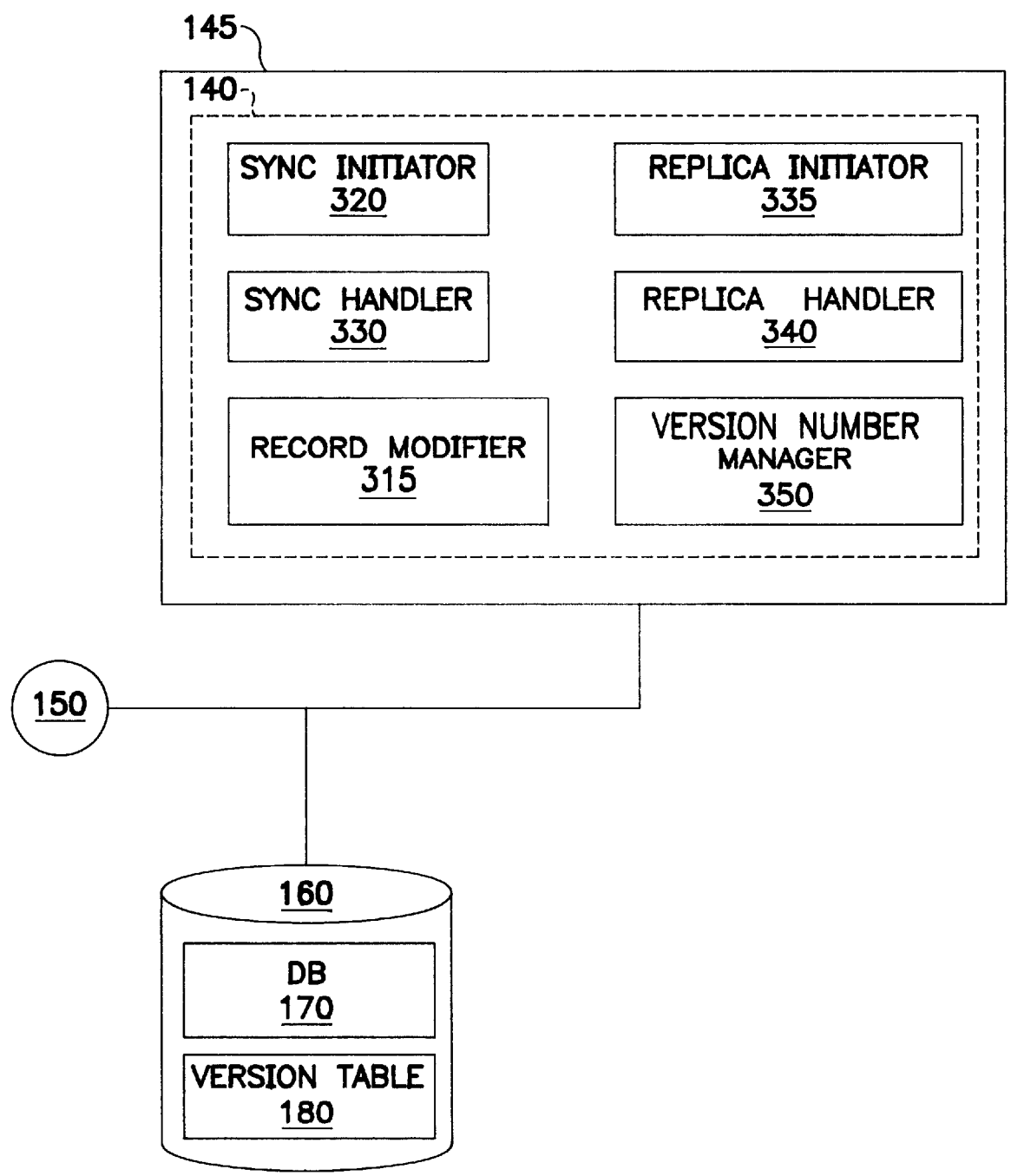
FIG. 1 is a block diagram which depicts an example of an overall architecture of a computing device.

FIG. 1 is a block diagram which depicts an example of an overall architecture of a computing device. The computing device can be, for example, a PC, a hand held device (such as a Palm Pilot, a smart phone, etc.), a workstation (such as RS6000), etc.

The computing device can include a CPU 150, memory 145 such as RAM, and storage devices 160 such as DASD. The memory 145 stores the client logic 140 (with details depicted in FIG. 2) preferably embodied as computer executable code which may be loaded from DASD 160 into memory 145 for execution by CPU 150. Many hand held devices store all information in memory without any storage devices. The computing device logic 140 includes a sync initiator 320 (with details depicted in FIG. 4), a sync handler 330 (with details depicted in FIG. 5), a replica initiator 335 (with details depicted in FIG. 8), a replica handler 340 (with details depicted in FIG. 9), a record modifier 315 (with details depicted in FIG. 10) and a version number manager (described below). It also maintains a version table 180 and a database 170 which can either reside in disk 160 or in main memory 145.

Past update activities are tracked so that independent updates from the different devices to the different replica of the same database can be consolidated. This is described below.

Consider the following example. Device 1 creates a database with 5 records. Then, devices 2 and 3 obtain a copy of that database from device 1. Afterwards, device 1 makes an update to record 1, and three updates to record 2. Device 2 makes an update to record 3 and device 3 makes an update to record 5. Device 4 then gets a copy of the database from device 3 and makes an update to record 4. Now, device 4 requests synchronization with device 1. The issue is which devices have the more up-to-date version of each record. In this case, device 4 has the more up-to-date version of records 4 and 5, while device 1 has the more up-to-date version of records 1 and 2. So during the synchronization, device 1 needs to update records 4 and 5, while device 4 needs to update records 1 and 2.

Consider another case where device 3 requests synchronization with device 1 before device 4. During the synchronization between devices 1 and 3, device 1 would need to update record 5, and device 3 would need to update records 1 and 2. When device 4 requests synchronization with device 1 later, device 1 only needs to update record 4 in contrast to the original case. Device 4 still needs to update records 1 and 2.

A third case will be that continuing from the second case, device 4 requests synchronization with device 2 before it requests sync with device 1. During sync between devices 4 and 2, device 4 updates record 3 and device 2 updates records 4 and 5. On the subsequent sync between devices 4 and 1, device 4 needs to update records 1 and 2, while device 1 needs to update records 3 and 4.

From the above examples, it can be, seen that in order to perform the synchronization correctly, one must know what updates from each of the devices are captured in each record.

FIGS. 2(a), 2(b) and 2(c) depict examples of version tables which contain the update information for exchange during synchronization to identify for each record which device has the more up-to-date version of that record. Each database has a version table and each of its records has an entry in the version table. The entry consists of two parts. The first part is the record ID and the second part is the version list. The version list includes a device-version component for each device with a replica of the database. It has the form of ((d1, v1), (d2, v2), . . . , (dk, vk)), where dk represents the i-th device ID and its version number vi. The number of bits required to represent the version number decides the size of the version table. Since the content of the version table is communicated during synchronization, a method is provided that can use a compact version number which consists of only a small number of maximum bits, say 2 to 4 bits. This number (or integer) can be specified by the user or system administrator.

As shown in FIG. 1, version manager 350 is included. Version number manager 350 includes logic which may be invoked, for example, by the user or system administrator. Version number manager 350 accomplishes configuration of the size of the compact version number. The size of the compact version number may be separately configured for each computing device that is being used. For example, devices that do not have a large memory (e.g., a Palm Pilot) may be set to have a compact version number with a size of, for example, 2 to 4 bits. By contrast, large devices (such as, for example, PCs) may be configured to have compact version numbers with a large size (e.g., 4 bytes).

The compact version number is used to track updates onto a particular record. The compact version number does not reflect updates to other records. For example, the compact version number, vi, is incremented by one each time the record is updated by the i-th device, di. Since the compact version number only consists of a few number of bits, for the often updated records, their compact version numbers can overflow and a method is provided to address this issue in the record modify routine depicted in FIG. 10.

Since each device can independently insert a new record, the record ID consists of two components the device ID creating the record and a unique sequence number assigned to that device. For example, record (2.1) represents the first record created by device 2 and record (1.5) represents the $5^{th}$ record created by device 1. Certainly, as the number of devices having a replica changes over time, the number of components in the version list also changes accordingly.

When a device inserts a new record, that record is given a version number of 1. When a device simply receives (for the first time) a replication of a record, the receiving device gives the newly received record a version number of 0.

Consider an example. Start with device 1 which creates a database with two records, record 1.1 and record 1.2. Their version numbers are all (1,1) as shown in FIG. 2(a). Now, device 2 comes and requests a replica. The version list will now become ((1,1)(2,0)) for both devices, as shown in FIG. 2(b). If device 2 inserts a new record, it will have a record ID (2.1) and version list ((1,0)(2,1)). If it updates record (1.2), the record will have a new version number ((1,1)(2, 1)). If device 1 updates record (1.1), it will have a new version number ((1,2)(2,0)). If it inserts a new record, the record will have an ID (1.3) and a version number ((1.1) (2.0)). If the two devices sync with each other, the resulting version is shown in FIG. 2(c).

Those skilled in the art will also appreciate that there are different ways to represent the record ID. One alternative implementation is not to directly include the device ID in the record ID, but to use separate tables or table partition to represent the records created from each device. Similarly, there are many alternative ways to implement the version list. One optimization is to eliminate all devices which have not yet made any updates to a record from its version list. That is to say, in FIG. 2(b), the version list for (1,1) is now reduced to (1,1). Another alternative is not to keep the device ID in the list, but to keep a table-wise order on the devices. For example, if the table-wise order on the devices is (device 1, device 2, device 3), then a more compact representation of the version list (1,1)(2,1)(3,0) is (1,1,0). Also, if a device has not yet made any update to any of the records, it can also be omitted from the version list.

Figure 3:
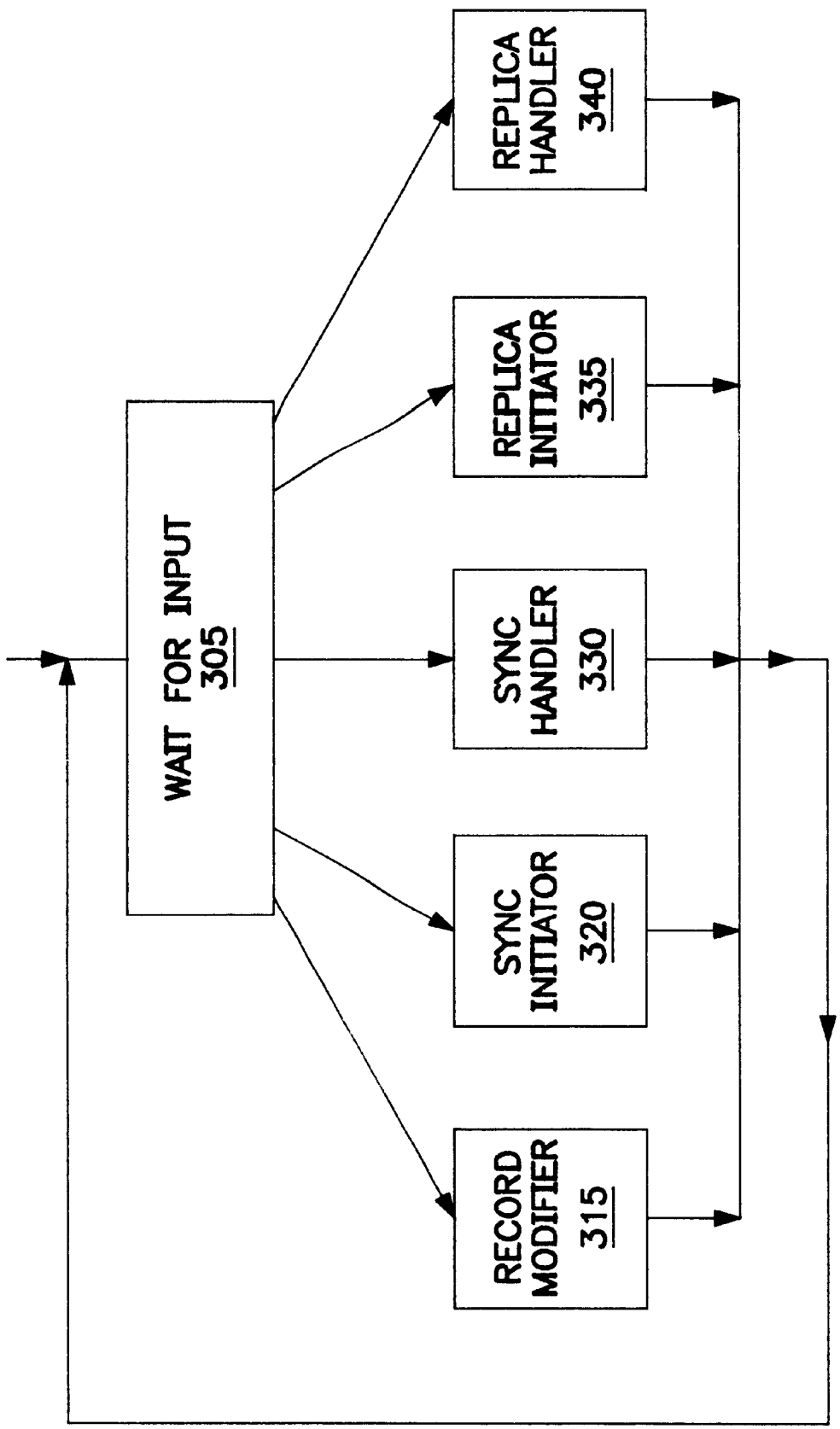
FIG. 3 is a flowchart diagram which illustrates exemplary execution of computing device logic.

FIG. 3 is a flowchart diagram which illustrates exemplary execution of computing device logic 140. In step 305, the device waits for input. Depending upon the type of input, the appropriate routine will be invoked. The sync initiator 320 is used to request database (or any data object) synchronization with another computing device. The sync handler 330 handles the sync request from another device to synchronize the two replica. The replica initiator 335 is used to request a replica of a database which the device does not yet have a copy, while the replica handler 340 is to provide the requesting device with a copy of the database. The record modifier 315 is used to handle the database modification of the local replica which can be a record update, deletion or insertion. A feature of the record modifier 315 is the way it updates the version list of the modifier record.

The sync handler 330 handles the sync request based on the version lists to determine whether versions of a record in the two replicas are in conflict, i.e., both devices have made updates to the same record. In that case, the sync handler routine only identifies the record in conflict. The conflict resolution is resolved at the application level. For example, consider a calendar application. If the very same event gets rescheduled in two different time slots via two different devices (presumably by two different persons), the sync server desirably flags the two conflicting records and lets the user or application resolve the conflict. If there is no conflict, the sync handler 330 uses the version list to determine which copy or version of a record is the up-to-date version to replace the other copy of the record. The sync handler 330 creates three separate lists of records: send-list, receive-list and conflict-list. Send-list includes the record IDs of those records where the local device has the more up-to-date version, while the receive-list includes the record IDs of those records where the remote device has the more up-to-date version. The conflict list includes the record IDs of those records where the local and remote devices have made conflicting updates.

Figure 4:
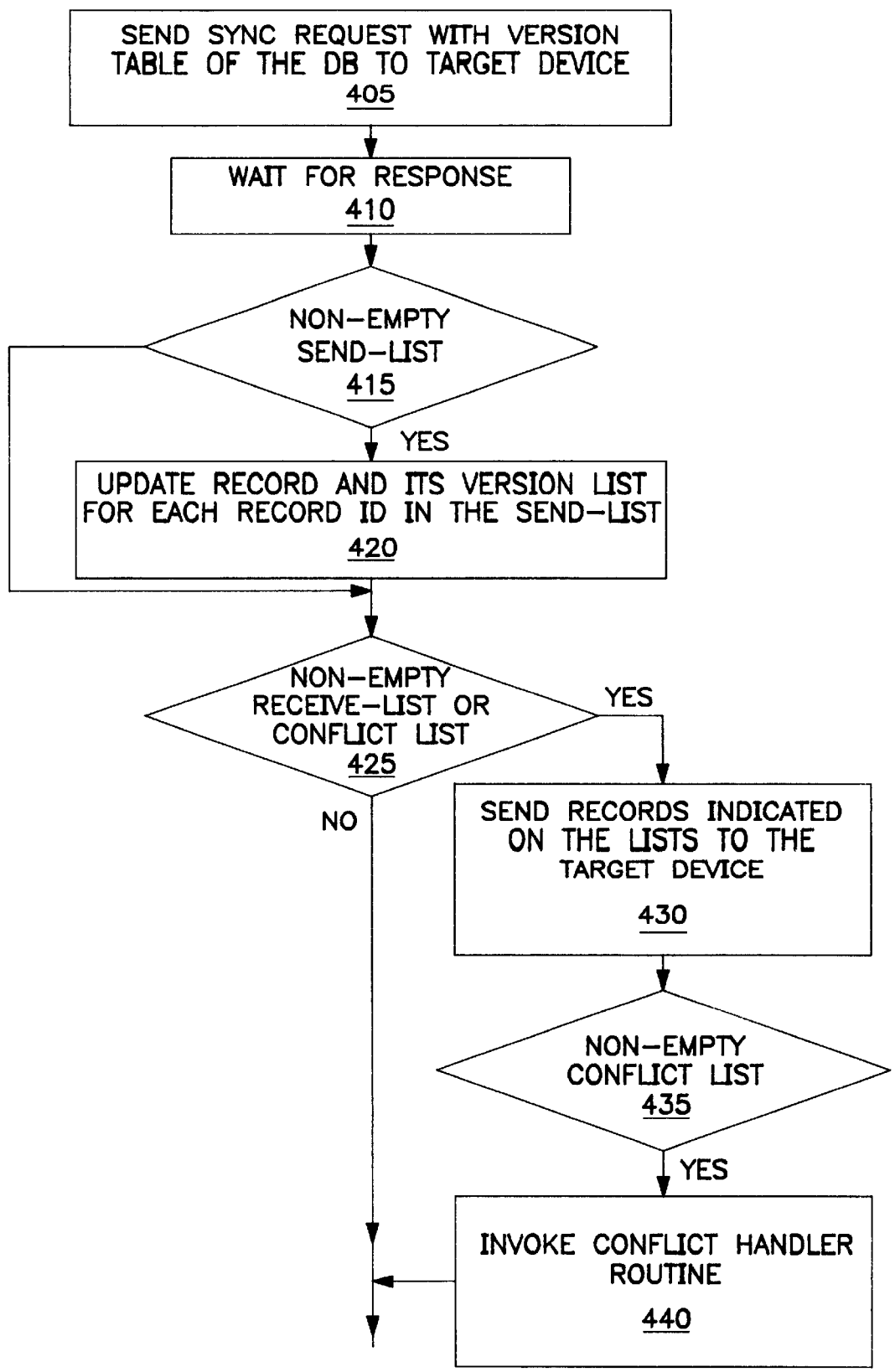
FIG. 4 is a flowchart diagram which illustrates exemplary operation of the sync initiator.

FIG. 4 is a flowchart diagram which illustrates exemplary operation of the sync initiator 320. At step 405, the computing device initiating the sync sends the sync request together with the version table of the database to the target device. It then waits for the response at step 410. When the response arrives, it checks at step 415 whether the send-list is non-empty. If so, at step 420, for each record ID in the send-list, it updates the record value and its version list. At step 425, it checks whether the receive-list or conflict-list is non-empty. If so, at step 430, it sends all records indicated on the receive-list and conflict-list to the target device. At step 435, it checks if the conflict-list is non-empty. If so, at step 440, it will invoke the conflict handler routine which, as mentioned before, is only recording the conflict for the application to resolve the conflict.

Figure 5:
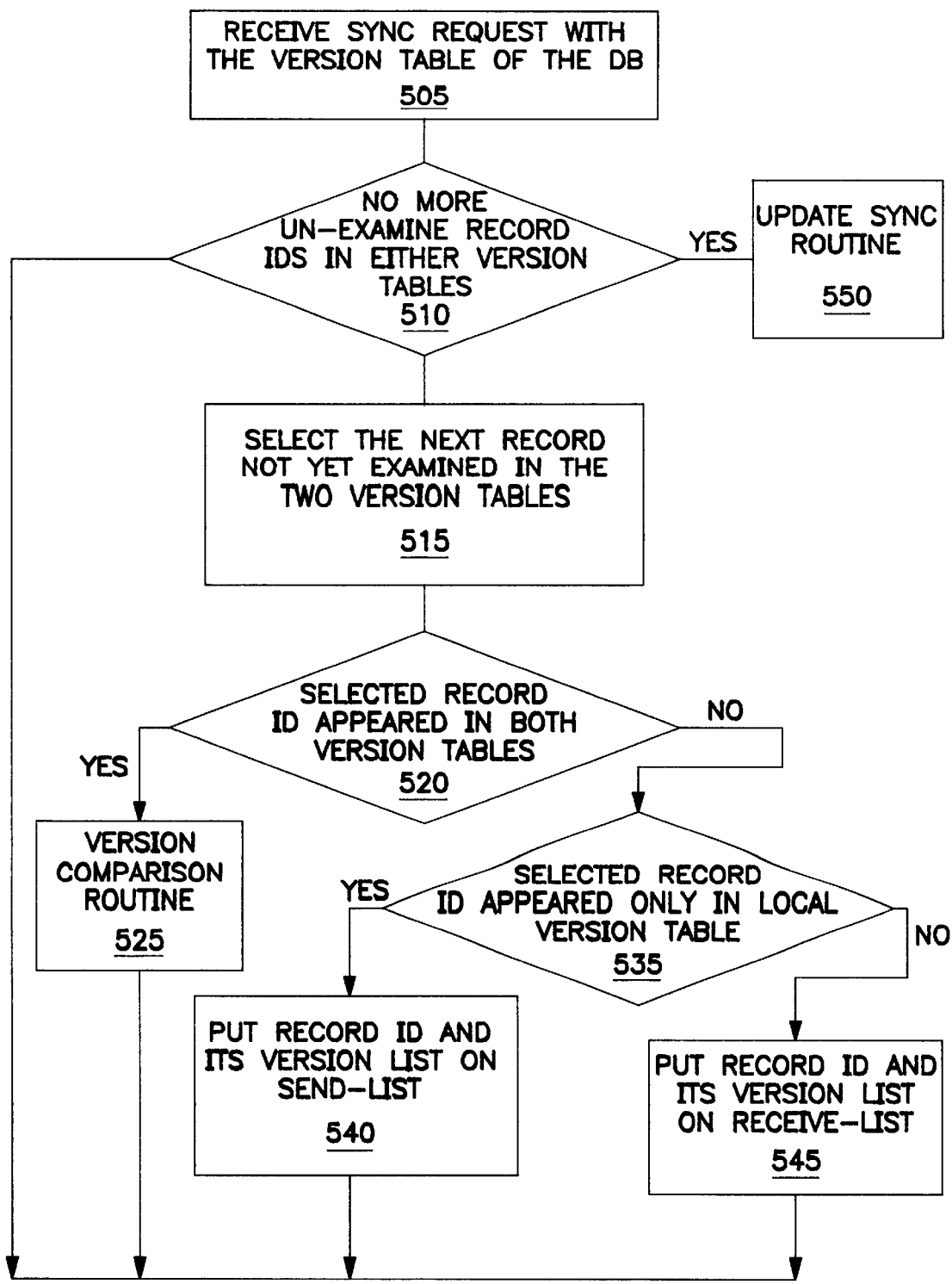
FIG. 5 is a flowchart diagram which illustrates exemplary operation of the sync handler.
Figure 6:
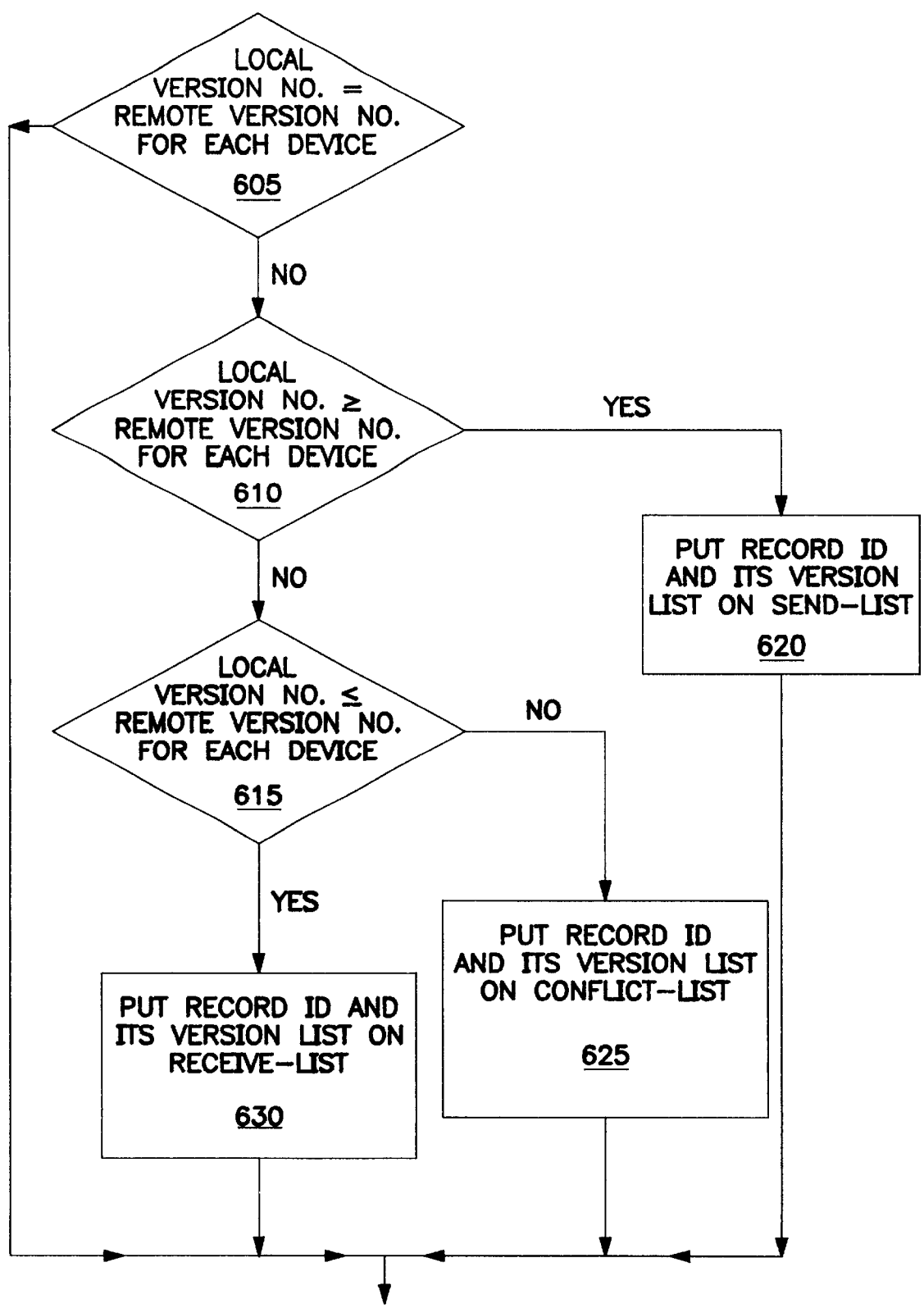
FIG. 6 is a flowchart diagram which illustrates exemplary execution of the version comparison routine.
Figure 7:
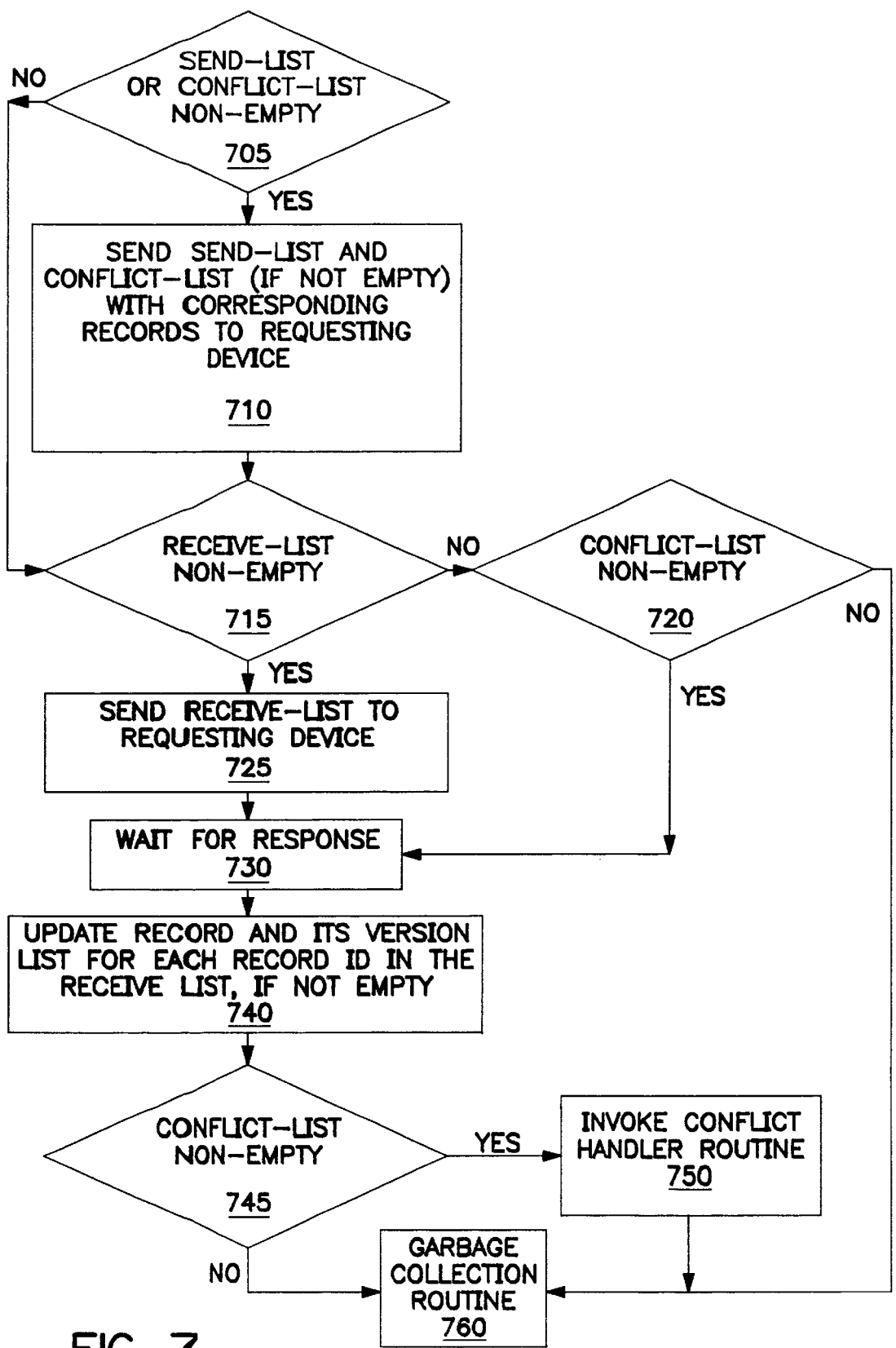
FIG. 7 is a flowchart diagram which illustrates exemplary execution of the update sync routine.

FIG. 5 is a flowchart diagram which illustrates exemplary operation of the sync handler 330. At step 505, the target device receives the sync request with the version table of the database. It then examines each of the record IDs indicated in either the local version table or the remote (requesting device) version tables. At step 510, if there is no more unexamined record IDs in either version tables, the update sync routine in FIG. 7 is invoked at step 550. Otherwise, at step 515, the next not yet examined record in the two version tables is selected. At step 520, it is checked if the selected record ID appeared in both version tables. If so, at step 525, the version comparison routine in FIG. 6 is invoked. Otherwise, at step 535, it is checked if the selected record ID appeared only in the local version table. If so, at step 540, the record ID and its version list is added to the send-list. Otherwise, the record ID only appears in the remote version table. At step 545, the record ID and its version list is added to the receive-list.

FIG. 6 is a flowchart diagram which illustrates exemplary execution of the version comparison routine in FIG. 5. At step 605, the local version number and the remote version number on every device are compared. If the devices included on the two version lists are not the same, each version list will be augmented to include the missing devices with the version number set to zero during the comparison. The local version table can be immediately updated, while the device IDs of the missing devices form the remote version table can be included in the send-list for the requesting device to update its version table later. If the version number is not the same on every device, it is further checked, at step 610, if the local version number is larger than or equal to the remote version number for every device.

If so, at step 620, the record ID and its version list are added to the send-list. If so, at step 615, it is checked whether the local version number is smaller than or equal to the remove version number for each device. If so, at step 630, the record ID and its version list are added to the receive-list. Otherwise, at step 625, the record ID and its version list are added to the conflict-list.

FIG. 7 is a flowchart diagram which illustrates exemplary execution of the update sync routine in FIG. 5. At step 705, it is checked whether the send-list or conflict-list is non-empty. If so, at step 710, the nonempty send-list and conflict-list will be augmented with the corresponding record for each record ID in the lists to be sent to the requesting device. At step 715, it is checked whether the receive-list is non-empty. If so, at step 725, the receive-list is sent to the requesting device. At step 730, the target device waits for the response from the requesting device. At step 720, if the conflict-list is non-empty, execution proceeds to step 730 to wait for the response. Upon receiving the response, at step 740, for each record ID in the receive-list, the record and its version list get updated. At step 745, if the conflict-list is non-empty, the conflict handler routine is invoked at step 750. As will be explained later with reference to FIG. 12, at step 760, the garbage collection routine can be invoked to clean up the space occupied by deleted records.

Figure 8:
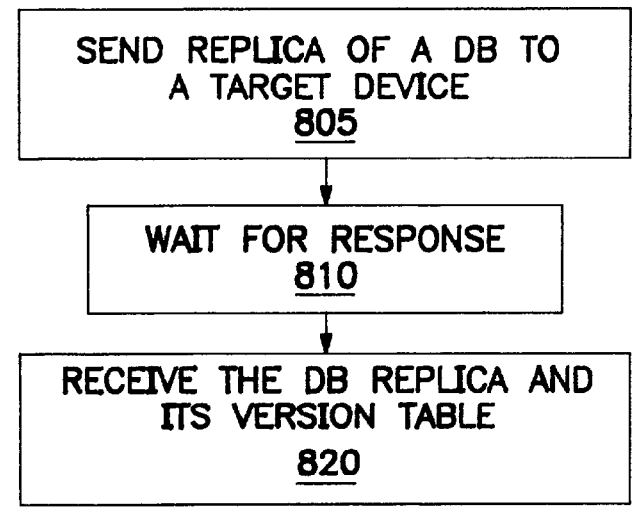
FIG. 8 is a flowchart diagram which illustrates exemplary operation of a replica initiator.

FIG. 8 is a flowchart diagram which illustrates exemplary operation of replica initiator 335. At step 805, a computing device sends a replica request of a database to a target device. At step 810, the computing device waits for the response. At step 820, the computing device receives the database replica and its version table.

Figure 9:
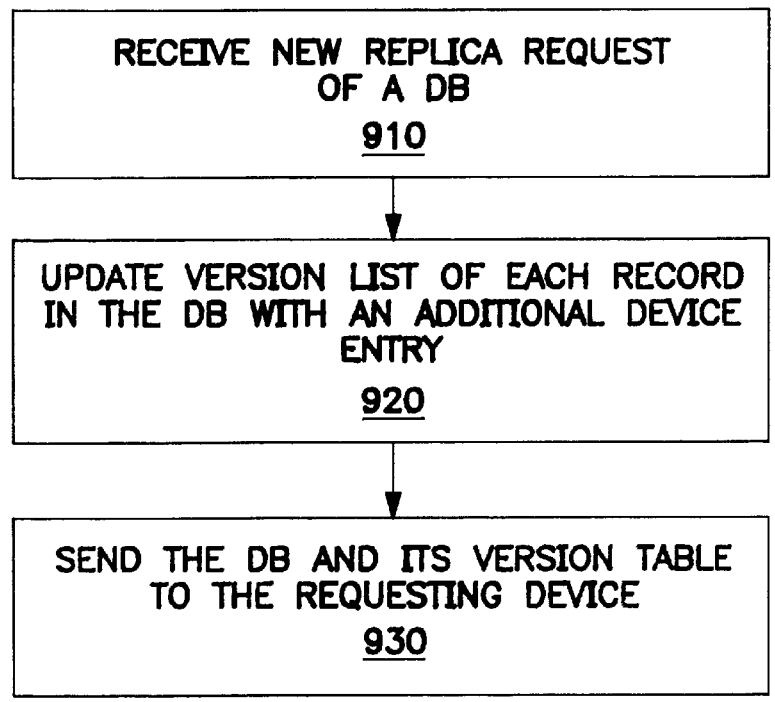
FIG. 9 is a flowchart diagram which illustrates exemplary operation of a replica handler.

FIG. 9 is a flowchart diagram which illustrates exemplary operation of replica handler 340. At step 910, the device receives a new replica request for a database. At step 920, the device updates the version table by adding to the version list of each record an additional component (dk, vk), where dk is the device ID of the requesting device, and vk is set to zero. At step 910, the database and its version table are sent to the requesting device.

Figure 10:
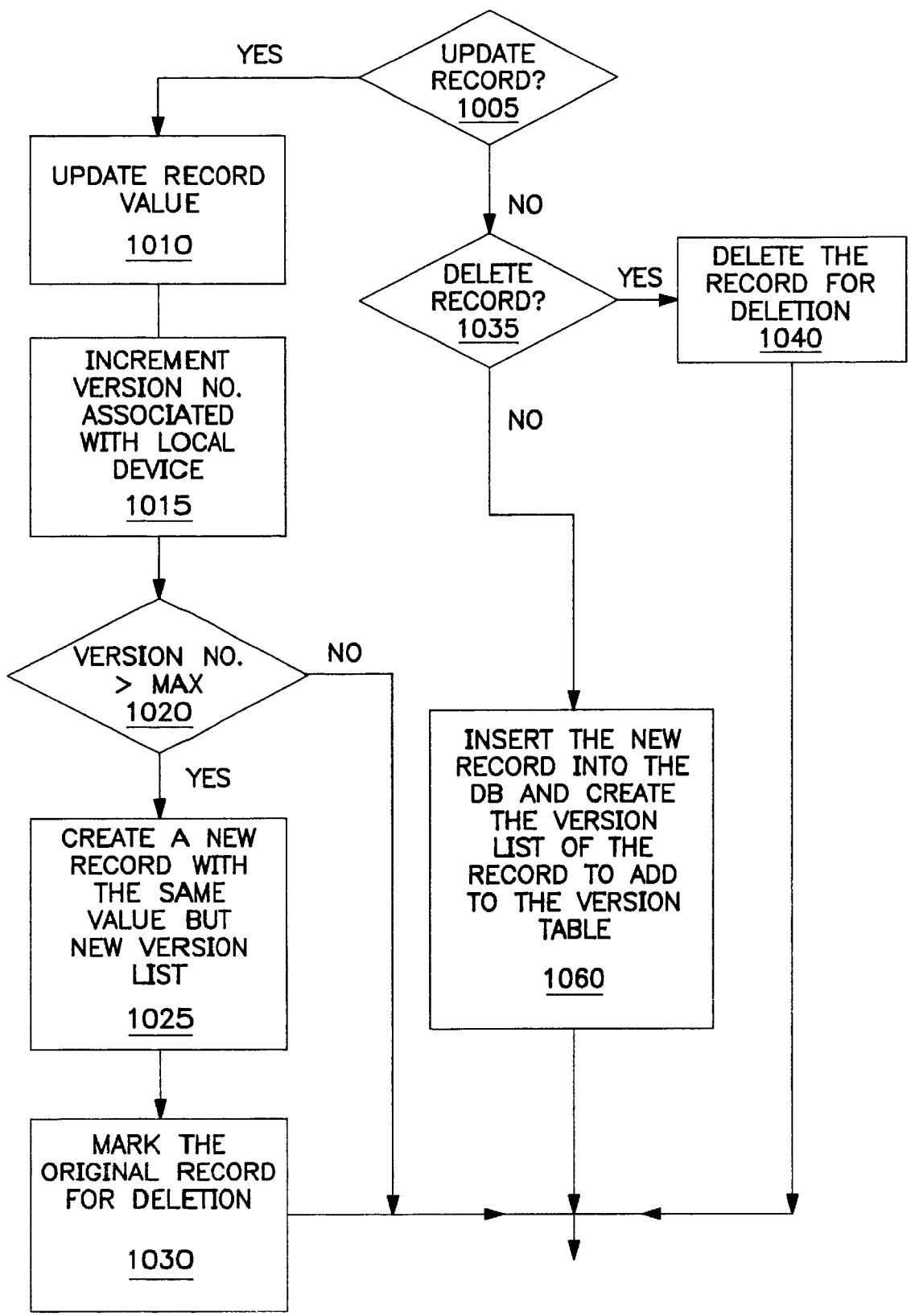
FIG. 10 is a flowchart diagram which illustrates exemplary operation of a record modifier.

FIG. 10 is a flowchart diagram which illustrates exemplary operation of the record modifier 315. There are, for example, three different ways to modify a database: update a record, delete a record and insert a new record. At step 1005, it is checked if the database modification request is to update a record. If so, at step 1010, the record value is updated. At step 1015, the version number associated with the local device is incremented by 1 (for example). At step 1020, it is checked for overflow, i.e., if the version number exceeds its maximum allowed value (e.g., if 4 bits are allocated to represent the version number, the maximum allowed value will be 15). If so, an overflow method (steps 1025 and 1030) is invoked. At step 1025, a new record is created with a new record ID and the same record value as the updated record. The version list will be the same as the updated record except that the version number is set to zero for the target device. At step 1030, the original record is marked as a deleted record. At step 1035, it is checked if the database modification request is to delete a record. If so, at step 1040, the record is marked as a deleted record. Otherwise, the request is a record insertion. At step 1060, a new record is inserted into the database with a version list created in the version table. The version number on each device is initialized to zero except for the local device which is set to one.

Those skilled in the art will also appreciate that there are alternative ways to increment the compact version number upon updates. An alternative method is to have the version number only capture the number of sync intervals with updates to the corresponding record, instead of the number of updates to the record, where a sync interval is the time interval between two consecutive sync points (to any devices). That is to say under this alternative method, multiple updates within a single sync interval by a device will only cause the version number to be incremented by 1. Only the first update to a record since the last synchronization will cause the version number (associated with the local device) to increase. This would reduce the number of times a version number exceeds its maximum value.

Because each device can modify any records independently, the version list of a deleted record is desirably kept after the record deletion. Otherwise, it would not be able to differentiate during synchronization whether the other device has an older version or the deleted record or conflicting version of the deleted record.

To eliminate storage waste, garbage collection can be done to recover storage occupied by records that have been marked for deletion. In the preferred embodiment, a method is provided using a three phase deletion protocol. The record deletion protocol uses two vectors for bookkeeping. A phase 1 vector is a bit vector to track the devices that have been notified on the record deletion. At the end of phase 1, every device with a copy of the database has been notified that the record is marked for deletion. A phase 2 vector is a bit vector to track the devices that are aware of the fact that all devices with a copy of the database have been notified that the said record is marked for deletion. All devices will have deleted both the version list of the record and the phase 1 vector by the end of phase 2. In phase 3, the devices can now delete the phase 2 vector. For a device in phase 3 on a deleted record, there is no longer any bookkeeping (such as phase 1 or phase 2 vector) maintained on the deleted record. All storage space is recovered on the said device for that record. By the end of phase 3, the phase 2 vector of the record is deleted from all devices.

Those skilled in the art will also appreciate that alternative ways can be used to implement the phase 1 and phase 2 vectors. In the preferred embodiment, the phase 1 and phase 2 vectors are considered to be part of the version table in FIG. 2. In addition to the two columns in the version table, a third column can be added to include a pointer to the phase 1 or phase 2 vector. One pointer suffices as a record can only be in phase 1 or phase 2 and at any given time, at most one of the vectors is needed. Alternatively, a separate deletion list can be maintained for all records marked for deletion with a pointer to their phase 1 or phase 2 lists.

In the preferred embodiment, after a record is marked for deletion, a phase 1 vector is desirably created. This step is desirably added to steps 1030 and 1040 depicted in FIG. 10 after the record has been marked for deletion. The record itself can in fact be deleted but its version list is desirably kept. During subsequent sync, the phase 1 vector is copied to other devices with the bit corresponding to the already notified devices turned on. When the last known device with a copy of the database gets notified on the deletion during the sync operation, the two synchronizing devices can actually delete their phase 1 vectors, create the phase 2 vectors (with the bits corresponding to the two devices turned on) and enter into phase 2. During phase 2, a device checks whether any new replica has been created during phase 1. If so, it adds the new device to the list of devices on the phase 2 vector. During phase 1, if a new device requests a replica from a device which already marked the record for deletion with an associated phase 1 vector, the new replica will also indicate the record is marked for deletion with an appropriate phase 1 vector created. Thus, even if a new replica created during phase 1 may not be included in the phase 1 vector of some of the devices, it does not pose a problem.

Consider an example with three devices. After device 1 has sync with device 2, a new device, device 4, requests a replica from device 1. Device 2 then requests sync with device 3. The two devices, not being aware of the existence of device 4, will enter into phase 2. Since device 4 also marks the record as deleted, the condition for entering into phase 2 is still satisfied. Unfortunately, the phase 1 vector of some of the devices may only indicate 3 devices. This will be addressed during phase 2. During phase 2, when the other device (say device 2) has sync with device 1, it will find out that an additional device has obtained a replica and augment its phase 2 vector. Thus, replica creation during phase 1 does not pose a problem. Similarly, during phase 2, the device with a new replica is also desirably included in the deleting process. During phase 2, if a new device makes a request for a replica, the new replica will also include information on the deleted record, specifically the phase 2 vector.

During phase 2, synchronization will lead to the synchronizing devices deleting the phase 1 vector and updating the phase 2 vector. When all the devices have gone through phase 2, the phase 2 vectors can be deleted. For a device with a partially specified phase 2 vector, it will delete the vector and enter into phase 3 during sync, if the other device has neither the phase 1 nor the phase 2 vector for that record. If the other device has a phase 1 vector for the record, that device will enter into phase 2 and the phase 2 vectors of both devices get updated to reflect the change. If the other device has a phase 2 vector, both devices should update their phase 2 vectors to be the union of the two.

Figure 11:
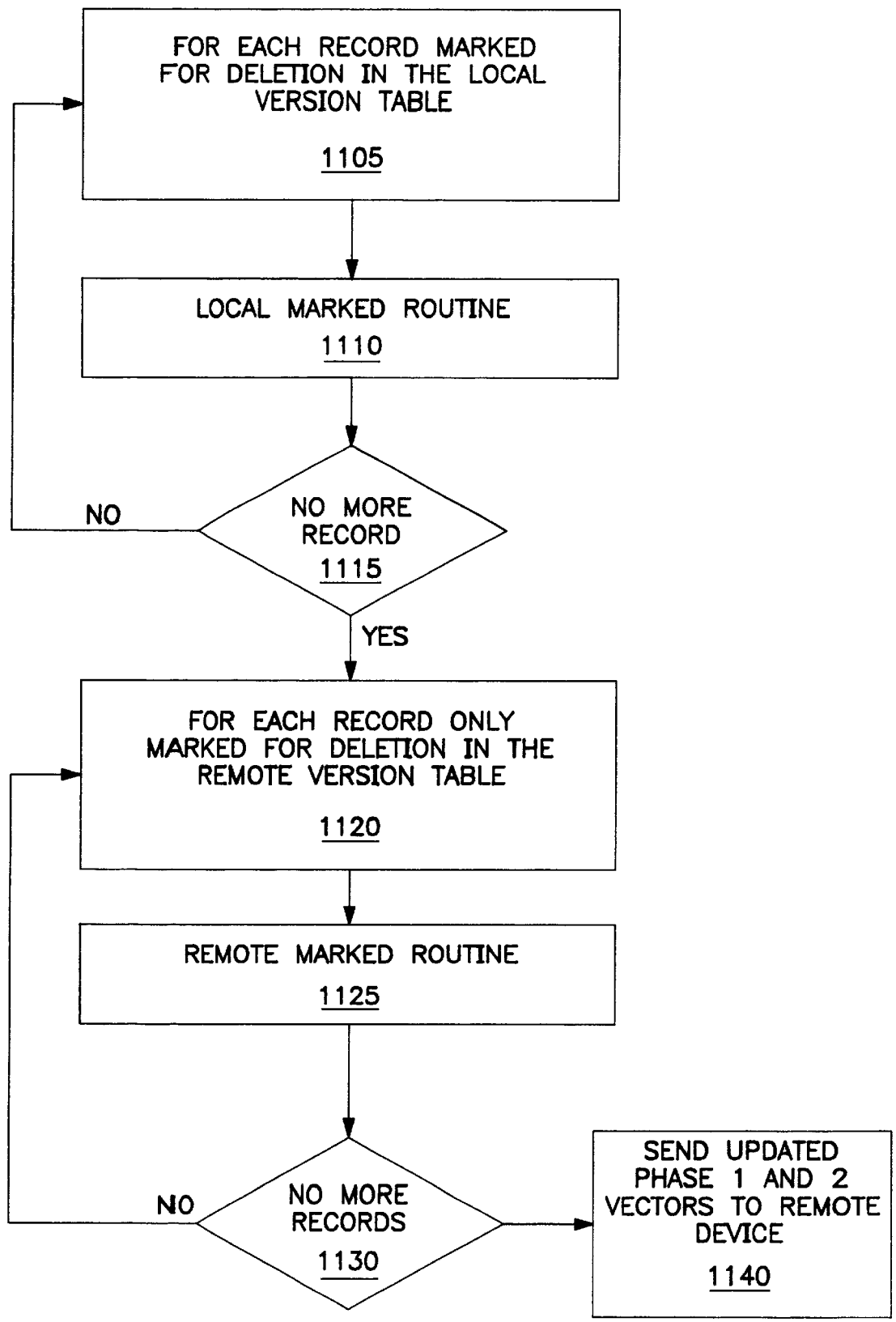
FIG. 11 is a flowchart diagram which illustrates a garbage collection routine.
Figure 12:
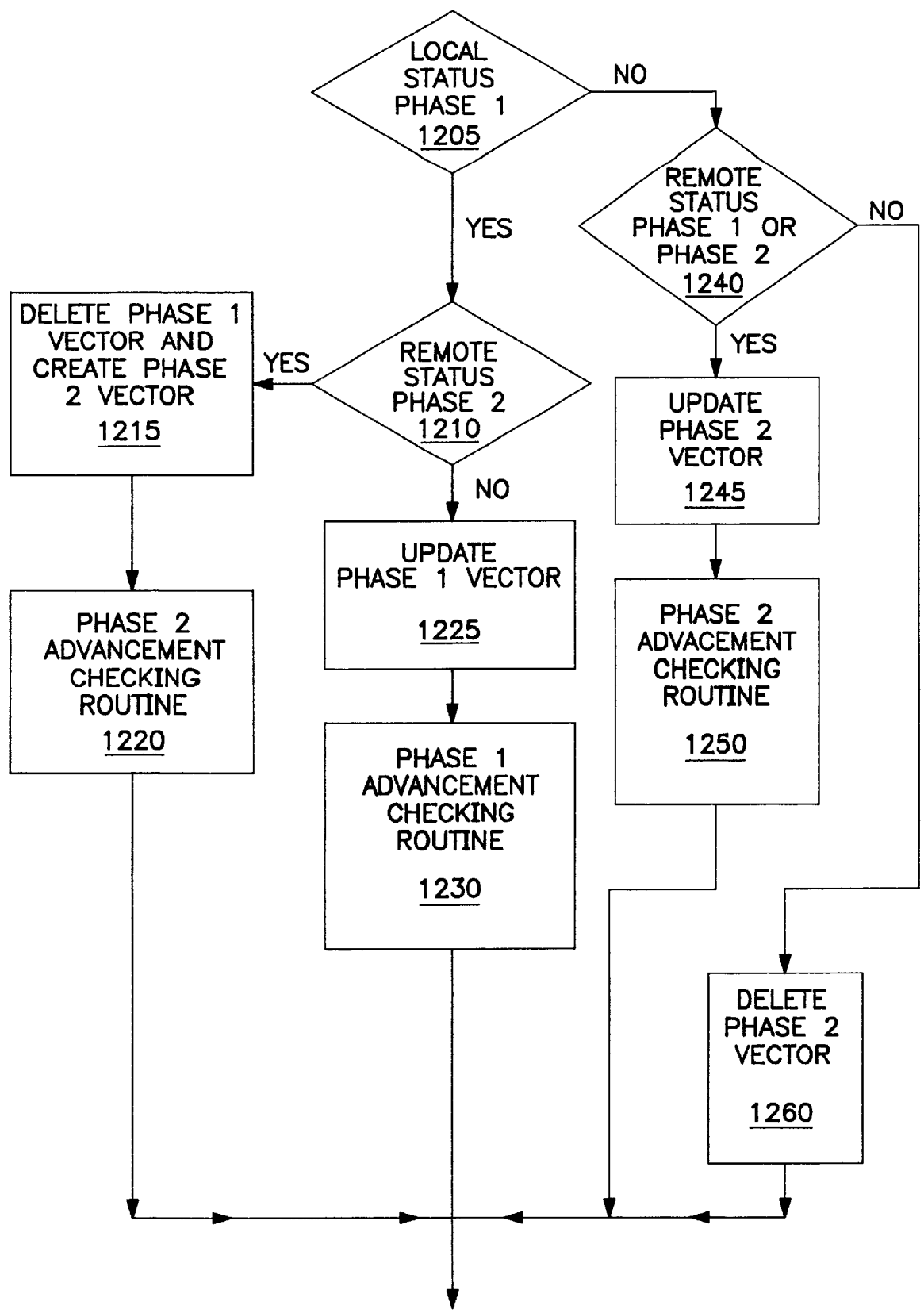
FIG. 12 is a flowchart diagram which illustrates a local marked routine.
Figure 13:
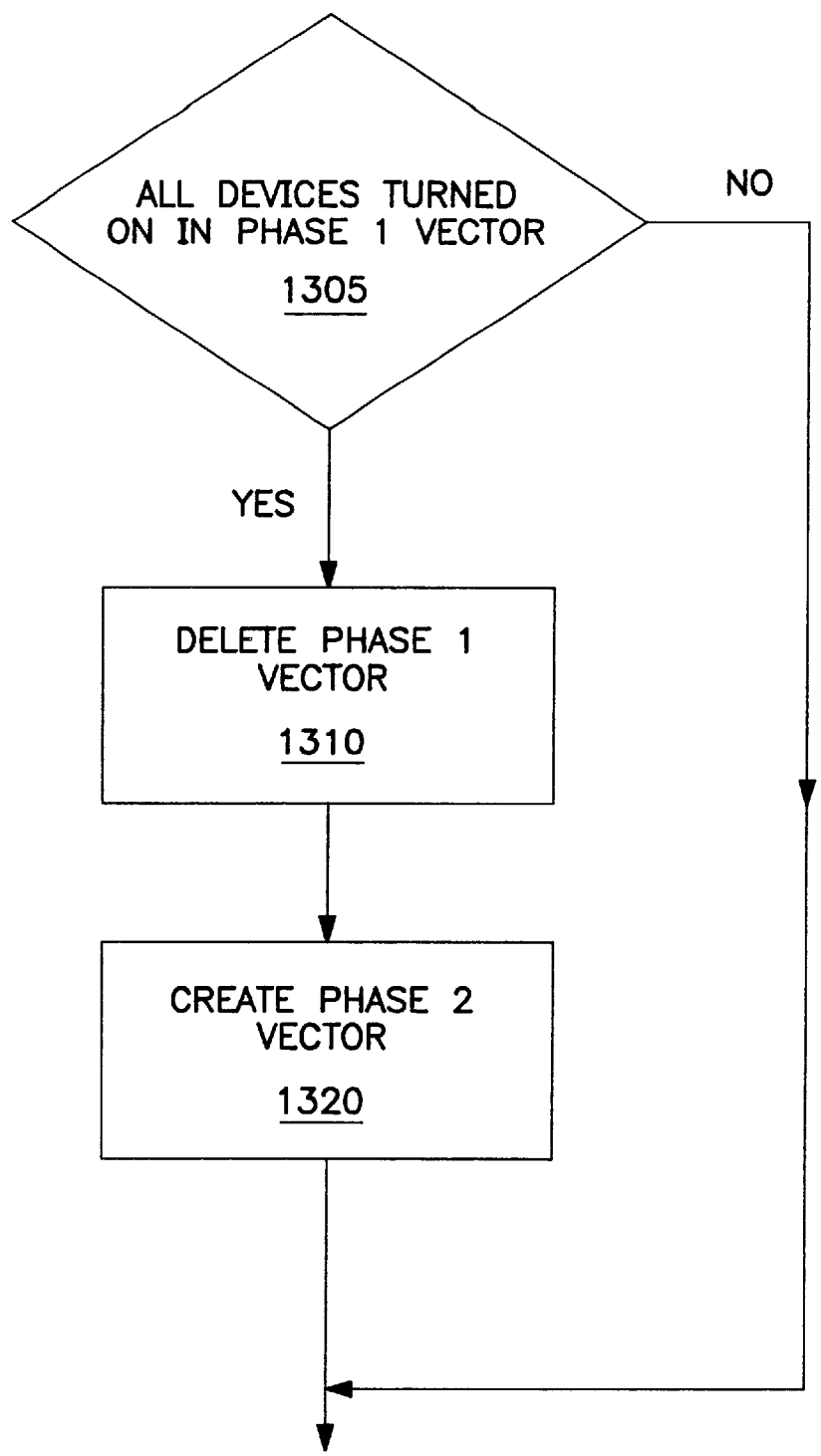
FIG. 13 is a flowchart diagram which illustrates an example of a phase one advancement checking routine.

FIG. 11 is a flowchart diagram which illustrates the garbage collection routine of FIG. 7. At step 1105, all records that have been marked for deletion in the local version table are identified. For each of these records, at step 1110, the local marked routine depicted in details in FIG. 12 is invoked. At step 1120, all records that have been marked for deletion in the remote version table are identified. For each of these records, at step 1125, the remote marked routine depicted in details in FIG. 13 is invoked. At step 1140, the phase 1 and phase 2 vectors that need to be updated (by the remote device) are sent to the remote device. When the remote device receives the updated phase 1 and phase vectors, it will update its phase 1 and phase 2 vectors accordingly.

Figure 14:
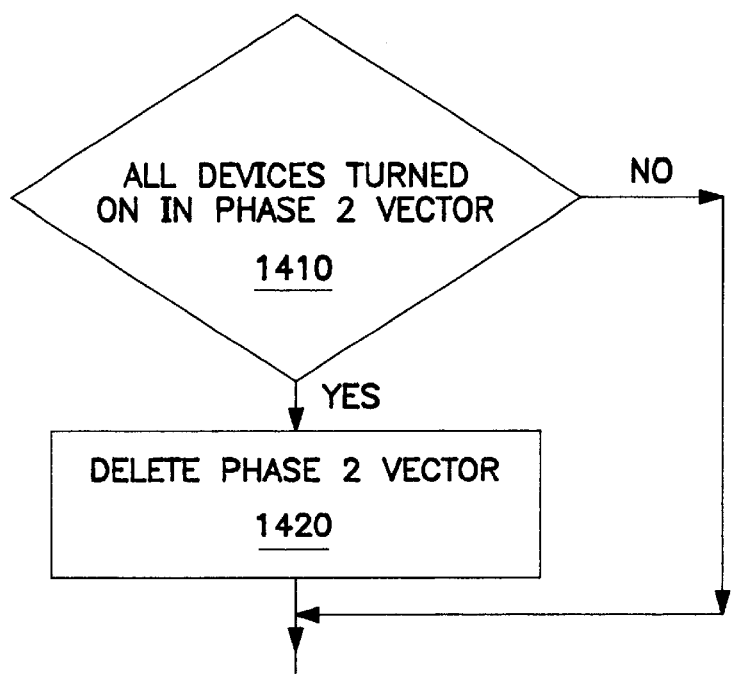
FIG. 14 is a flowchart diagram which illustrates an example of a phase two advancement checking routine.

FIG. 12 is a flowchart diagram which illustrates the local marked routine. At step 1205, it is checked if the record is considered to be in phase 1 by the local device. If so, at step 1210, it is checked whether the record is considered to be in phase 2 by the remote device. If so, at step 1215, the phase 1 vector is deleted and a phase 2 vector is created for the record in the local device. This is to recognize that the deleted record is now in phase 2. This newly created phase 2 vector will be the same as the remote phase 2 vector for that record with the exception that the bit position corresponding to this device will not be turned on. At step 1220, the phase 2 advancement checking routine depicted in FIG. 14 is invoked. At step 1225, the phase 1 vector for the local device is updated. Specifically, if the remote device is in phase 1, the new phase 1 vector is not the union of the phase 1 vectors of the two devices. If the remote device has not marked the record for deletion, the bit corresponding to the remote device is now turned on in phase 1 vector. The exception is that if the remote version list is in conflict with the local version list, it is addressed in step 625. At step 1230, the phase 1 advancement checking routine depicted in FIG. 13 is invoked. At step 1240, it is checked whether the record is considered to be in either phase 1 or phase 2 in the remote device, while it is considered to be in phase 2 in the local drive. If so, at step 1245, the phase 2 vector is updated. If the record is also in phase 2 in the remote device, the new phase 2 vector will be the union of the two phase 2 vectors of the local and remote devices. Otherwise, it will be the local phase 2 vector with the additional bit corresponding to the remote device turned on. At step 1250, the phase 2 advancement checking routine is invoked. At step 1260, the phase 2 vector is deleted. This corresponds to entering the third phase of the record deletion process as the remote device is already in phase 3.

FIG. 13 is a flowchart diagram which illustrates an example of the phase 1 advancement checking routine of FIG. 12. At step 1305, it is checked whether all devices have their corresponding bits turned on in the phase 1 vector of the record. If so, at step 1310, the phase 1 vector is deleted. The deletion process of the record now enters into phase 2. At step 1310, a phase 2 vector is created for the record with the bits corresponding to the two synchronizing devices turned on.

FIG. 14 is a flowchart diagram which illustrates an example of the phase 2 advancement checking routine in FIG. 12. At step 1410, it is checked whether all devices have their corresponding bits turned on in the phase 2 vector of the record. If so, at step 1420, the phase 2 vector is deleted. The deletion operation of the record now enters into phase 3.

Figure 15:
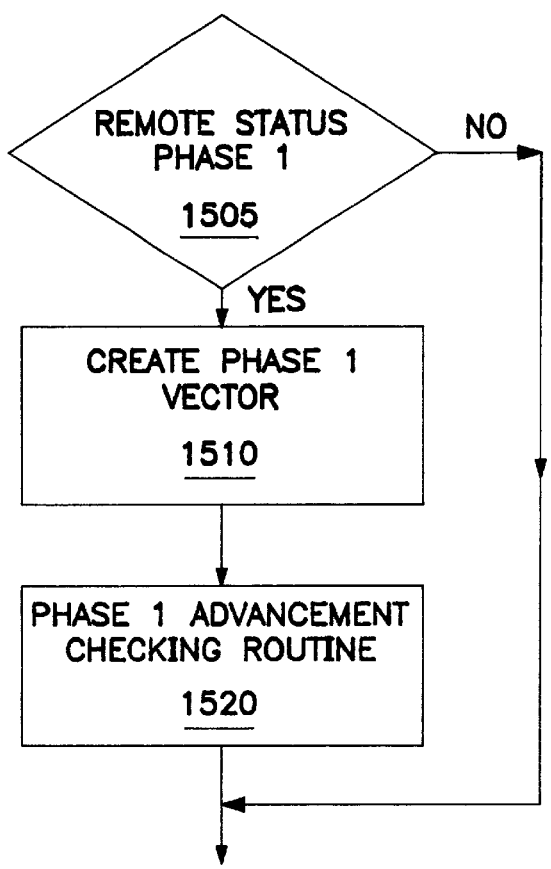
FIG. 15 is a flowchart diagram which illustrates an example of a remote mark routine.

FIG. 15 is a flowchart diagram which illustrates an example of the remote marked routine. At step 1505, it is checked if that record is in phase 1 of the deletion process at the remote requesting device. If so, this corresponds to the case that while a record is in phase 1 of the deletion process at the remote requesting device, it is not yet marked as a deleted record in the local device. At step 1510, a phase 1 vector with an additional bit corresponding to the local device turns on. An exception is that if the remote version list is in conflict with the local version list, it is addressed in step 625. At step 1520, the phase 1 advancement checking routine in FIG. 13 is invoked. It is noted that at step 1505, if the record is in phase 2 at the remote site, it means that the local site is already entered into phase 3 with the phase 2 vector deleted. No further step needs to be done at the local site. The remote site would need to delete the phase 2 vector to enter into phase 3 when it received all the updated phase 1 and phase 2 vectors for all deleted records from the local device.

Those skilled in the art will also appreciate that although the preferred embodiment of the present invention only has the version list attached to each record, the approach can be straightforwardly generalized to a hierarchical approach of attaching a version list to the whole database or a partition of the database. The advantage of the hierarchical approach is as follows. First of all, it can save the amount of information exchange, or the communication bandwidth requirement. At sync time, the sync initiator will is send the version list of the database (instead of the version table) to the target server. If the two version lists of the database are the same, the two databases are in sync. No further exchange of information is required. Otherwise, the version table of the requesting device is desirably sent to the target device as before.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of synchronizing a plurality of computing devices each containing respective database replicas, each of said replicas having respective records, said method comprising the steps of:
    a) configuring a maximum size, in bits, for a version number, said maximum size separately configurable for each of said computing devices;
    b) maintaining, for each of said computing devices, said version numbers for each of said respective records, said version numbers having said maximum size;
    c) transmitting a synchronization request between said computing devices; and
    d) synchronizing said computing devices so that said respective data base replicas have common records based upon said version numbers respectively maintained for said computing devices.

2. A method of synchronizing a plurality of computing devices according to claim 1, wherein said version numbers for a first of said computing devices is maintained in a first list and said version numbers for a second of said computing devices is maintained in a second list.

3. A method of synchronizing a plurality of computing devices according to claim 2, wherein said first list and said second list indicate respective records which correspond and are different versions, and, during synchronizing, at least one of said first of said computing devices and said second of said computing devices are updated so that the first of said computing devices and the second of said computing devices have respective records which correspond and have the same versions.

4. A method of synchronizing a plurality of computing devices according to claim 2, wherein during synchronizing at least one of said first list and said second list are updated so that said first list and said second list indicate respective records which correspond to each other.

5. A method of synchronizing a plurality of computing devices according to claim 1, wherein a respective one of said version numbers is incremented when a respective one of said devices updates a respective one of said records.

6. A method of synchronizing a plurality of computing devices according to claim 2, wherein during synchronizing, one of said records is deleted from one of said first of said computing devices and said second of said computing devices so that the first of said computing devices and the second of said computing devices have the same corresponding records.

7. A method of synchronizing a plurality of computing devices according to claim 6, wherein storage space occupied by said deleted one of said records is subjected to garbage collection.

8. A method of synchronizing a plurality of computing devices according to claim 7, wherein if said respective one of said version numbers is incremented to a maximum value, then a new record is created and said respective one of said records is deleted.

9. A method of synchronizing a plurality of computing devices according to claim 1, wherein one of said version numbers is incremented by a fixed increment regardless of number of updates to said record corresponding to said one of said version numbers between successive synchronizations to said computing device having said record.

10. A method of synchronizing a plurality of computing devices according to claim 1, wherein a respective further version number is assigned each of said database replicas.

11. A method of synchronizing a plurality of computing devices according to claim 1, wherein step d) is preceded by the step of attempting synchronization of said computing devices based upon said respective further version number of each of said plurality of computing devices.

12. A method of synchronizing a plurality of computing devices according to claim 1, wherein one of said version numbers is maintained both locally to a respective computing node and remotely therefrom, and wherein said locally and remotely maintained one of said version numbers are compared to determine if a conflict exists.

13. A method of synchronizing a plurality of computing devices according to claim 7, wherein garbage collection includes the steps of:
    a) notifying each of said devices to delete said record;
    b) notifying each of said devices that each of said devices has successfully been notified to delete said record; and
    c) notifying each of said devices that step b) has been successfully completed.

14. A method of synchronizing a plurality of computing devices according to claim 1, wherein said maximum size for each of said computing devices is different.

15. A method of synchronizing a plurality of computing devices according to claim 1, wherein said maximum value is an integer.

16. A computing device, one of a plurality of computing devices, having a database replica, said database replica comprising a plurality of records, said computing device comprising:
    request means for providing a synchronization request to a farther computing device having a further database replica comprised of a further plurality of records;
    version table means for maintaining version numbers for each of said plurality of records, said version numbers each having a maximum size, in bits;
    version number manager means for configuring said maximum size, said maximum size separately configurable for each of said computing devices; and
    synchronization means for synchronizing said plurality of records with said further plurality of records based upon said version numbers.

17. A computing device according to claim 16, wherein said version numbers are integers.

18. A computing device, one of a plurality of computing devices, having a database replica, said database replica comprising a plurality of records, said computing device comprising:
    request means for providing a synchronization request between said computing devices;
    version table means for maintaining version numbers for each of said plurality of records in each of said computing devices, said version numbers each having a maximum size, in bits;
    version number manager means for configuring said maximum size, said maximum size separately configurable for each of said computing devices; and
    synchronization means for synchronizing said plurality of records in each of said computing devices based upon said version numbers.

19. A plurality of computing devices according to claim 18, wherein said maximum size for each of said computing devices is different.

20. A plurality of computing devices according to claim 18, wherein said version numbers for a first of said computing devices is maintained in a first list and said version numbers for a second of said computing devices is maintained in a second list.

21. A plurality of computing devices according to claim 20, wherein said first list and said second list indicate respective records which correspond and are different versions, and, during synchronizing, at least one of said first of said computing devices and said second of said computing devices are updated so that the first of said computing devices and the second of said computing devices have respective records which correspond and have the same versions.

22. A plurality of computing devices according to claim 20, wherein during synchronizing at least one of said first list and said second list are updated so that said first list and said second list indicate respective records which correspond to each other.

23. A plurality of computing devices according to claim 18, wherein a respective one of said version numbers is incremented when a respective one of said devices updates a respective one of said records during synchronizing.

24. A plurality of computing devices according to claim 20, wherein during synchronizing, one of said records is deleted from one of said first of said computing devices and said second of said computing devices so that the first of said computing devices and the second of said computing devices have the same corresponding records.

25. A plurality of computing devices according to claim 23, wherein if said respective one of said version numbers is incremented to a maximum value, then a new record is created and said respective one of said records is deleted.

26. An article of manufacture comprising a computer useable medium having computer readable code means embodied thereon for synchronizing a plurality of computing devices each containing respective database replicas, each of said replicas having respective records, the computer readable program code means in said article of manufacture comprising computer readable program code means for causing a computer to effect:
   a) configuring a maximum size, in bits, for a version number, said maximum size separately configurable for each of said computing devices;
   b) maintaining, for each of said computing devices, said version numbers for each of said respective records, said version numbers having said maximum size;
   c) transmitting a synchronization request between said computing devices; and
   d) synchronizing said computing devices so that said respective data base replicas have common records based upon said version numbers respectively maintained for said computing devices.

27. An article of manufacture as recited in claim 26, the computer readable program means in said article of manufacture further comprising computer readable program means for causing a computer to effect maintenance of said version numbers for a first of said computing devices in a first list and said version numbers for a second of said computing devices in a second list.

28. An article of manufacture as recited in claim 27, wherein said first list and said second list indicate respective records which correspond and are different versions, the computer readable program code means in said article of manufacture further comprising computer readable program means for causing a computer to effect updating of said second of said computing devices so that the first of said computing devices in the said second of computing devices have respective records which correspond and have the same versions during synchronizing.

29. A program storage device readable by machine, tangibly embodying a program of instructions executable by the machine to perform method steps for synchronizing a plurality of computing devices each containing respective database replicas, each of said replicas having respective records, said method comprising the steps of:
   a) configuring a maximum size, in bits, for a version number, said maximum size separately configurable for each of said computing devices;
   b) maintaining, for each of said computing devices, said version numbers for each of said respective records, said version numbers having said maximum size;
   c) transmitting a synchronization request between said computing devices; and
   d) synchronizing said computing devices so that said respective data base replicas have common records based upon said version numbers respectively maintained for said computing devices.

30. A program storing device as recited in claim 29, wherein said version numbers for a first of said computing devices is maintained in a first list and said version numbers for a second of said computing devices is maintained in a second list.

31. A program storing device as recited in claim 30, wherein said first list and said second list indicate respective records which correspond and are different versions, and, during synchronizing, at least one of said first of said computing devices and said second of said computing devices are updated so that the first of said computing devices and the second of said computing devices have respective records which correspond and have the same versions.

32. A method of synchronizing a plurality of computing devices according to claim 1, wherein at least one of said computing devices is a hand held device.

33. A plurality of computing devices according to claim 18, wherein at least one of said computing devices is a hand held device.

* * * * *

UNITED STATES PATENT AND TRADEMARK OFFICE
CERTIFICATE OF CORRECTION

PATENT NO.   : 6,343,299 B1
DATED        : January 29, 2002
INVENTOR(S)  : Huang et al.

Page 1 of 1

It is certified that error appears in the above-identified patent and that said Letters Patent is hereby corrected as shown below:

Column 1,
Line 17, after the word "Palm Pilot," insert -- THINKPAD --.

Signed and Sealed this

Twenty-third Day of April, 2002

Attest:

JAMES E. ROGAN
*Attesting Officer*   *Director of the United States Patent and Trademark Office*